United States Patent
Kim et al.

(10) Patent No.: US 7,978,732 B2
(45) Date of Patent: Jul. 12, 2011

(54) APPARATUS AND METHOD FOR DECIDING TRANSMISSION FORMAT USING VARIABLE FRAME LENGTH AND DECODING METHOD USING THE SAME

(75) Inventors: Pan-Soo Kim, Daejon (KR); In-Ki Lee, Busan (KR); Tae-Hoon Kim, Seoul (KR); Dae-Ig Chang, Daejon (KR); Deock-Gil Oh, Daejon (KR); Won-Jin Sung, Seoul (KR); Deok-Chang Kang, Seoul (KR); Seok-Heon Kang, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 142 days.

(21) Appl. No.: 12/094,325

(22) PCT Filed: Dec. 11, 2006

(86) PCT No.: PCT/KR2006/005380
§ 371 (c)(1),
(2), (4) Date: May 20, 2008

(87) PCT Pub. No.: WO2007/067021
PCT Pub. Date: Jun. 14, 2007

(65) Prior Publication Data
US 2008/0285591 A1    Nov. 20, 2008

(30) Foreign Application Priority Data

Dec. 9, 2005 (KR) .......... 10-2005-0121109
Apr. 17, 2006 (KR) .......... 10-2006-0034704

(51) Int. Cl.
*H04J 3/16* (2006.01)

(52) U.S. Cl. .......... 370/470; 370/509
(58) Field of Classification Search .......... 370/470–471, 370/503–520
See application file for complete search history.

(56) References Cited

U.S. PATENT DOCUMENTS

| 7,558,293 B2 * | 7/2009 | Choi et al. .......... 370/509 |
| 2004/0125883 A1 | 7/2004 | Chang et al. |
| 2004/0252725 A1 | 12/2004 | Sun et al. |
| 2005/0135507 A1 | 6/2005 | Chang et al. |
| 2005/0265220 A1 * | 12/2005 | Erlich et al. .......... 370/208 |

FOREIGN PATENT DOCUMENTS

| JP | 2005-130438 | 5/2005 |
| JP | 2006-254120 A | 9/2006 |
| KR | 2000-0075164 A | 12/2000 |
| KR | 2002-0004065 A | 2/2002 |
| KR | 2003-0033828 | 5/2003 |
| KR | 2003-0080000 | 10/2003 |
| KR | 20040010715 | 1/2004 |

* cited by examiner

*Primary Examiner* — Phuc Tran
(74) *Attorney, Agent, or Firm* — Rabin & Berdo, PC

(57) ABSTRACT

Provided are an apparatus and method for deciding a transmission format using a variable frame length and a decoding method using the same. The apparatus for deciding the transmission format using the variable frame length includes: a frame synchronization acquiring unit for acquiring a frame synchronization of a received transmission frame; a correlation analyzing unit for performing a correlation analysis with respect to the transmission frame whose synchronization is acquired, considering frame lengths of respective frame structures; and a transmission frame structure deciding unit for deciding the structure of the received transmission frame using the analyzed correlation. Accordingly, a physical layer signaling code (PLSC) demodulation and decoding performance can be enhanced by determining the structure of the transmitted frame without carrying out a PLSC decoding in such a state that a frequency synchronization is not acquired.

8 Claims, 3 Drawing Sheets

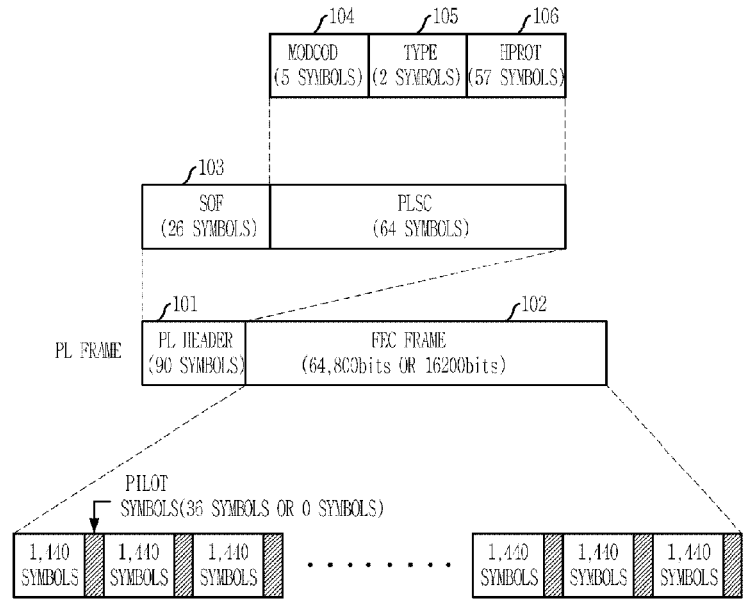
[Fig. 1]
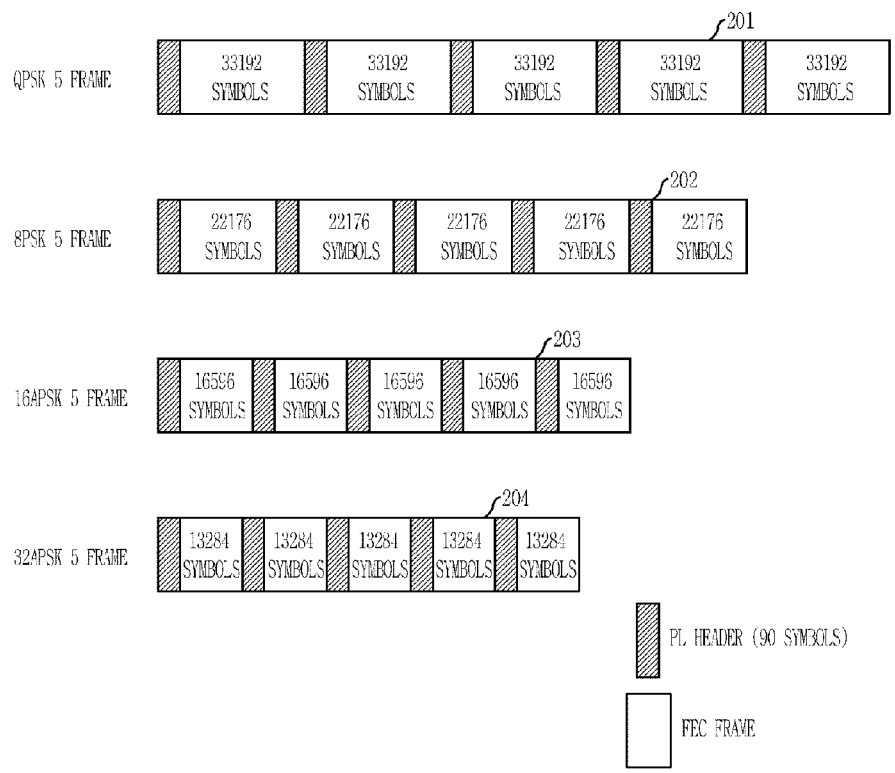
[Fig. 2]
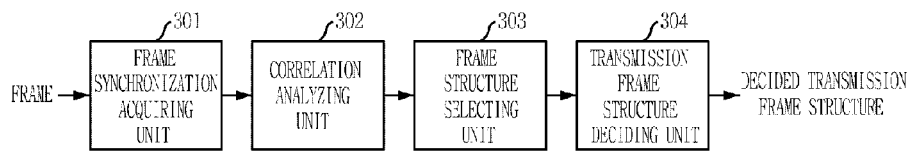
[Fig. 3]

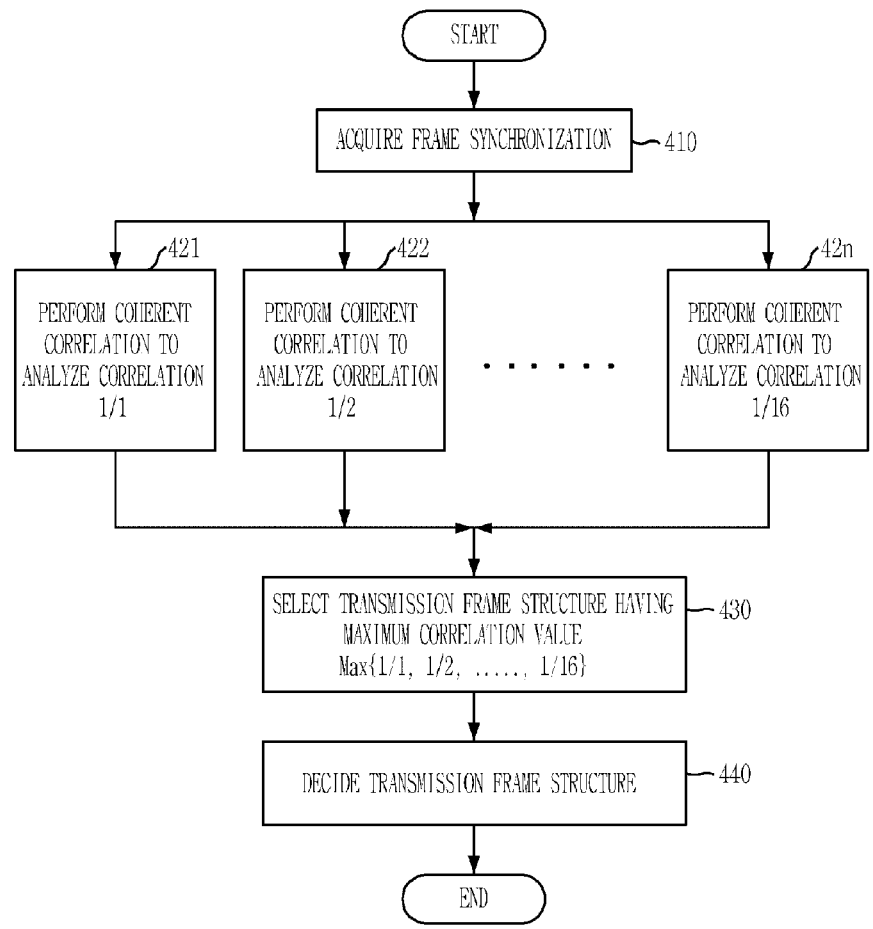
[Fig. 4]
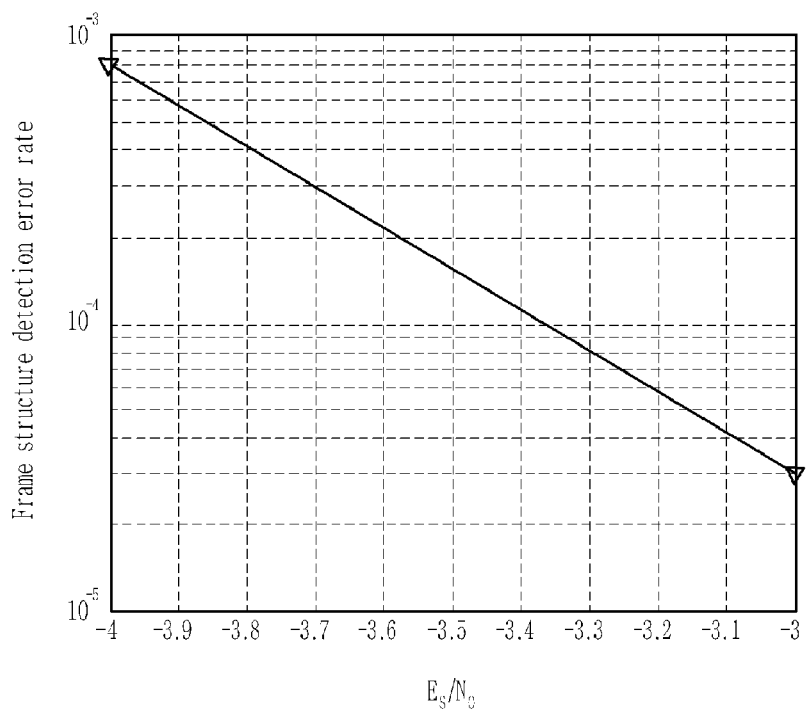
[Fig. 5]

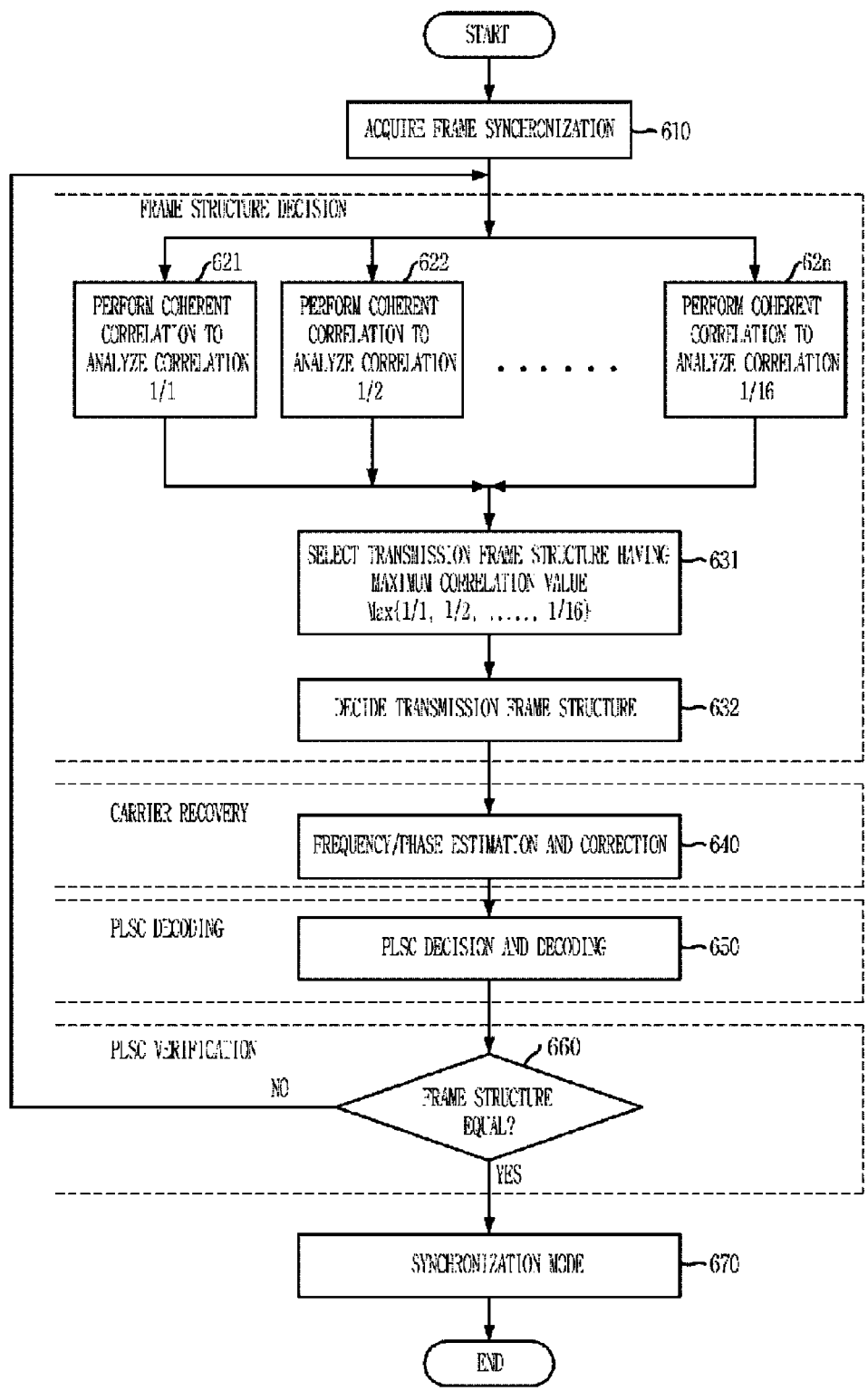
[Fig. 6]

US 7,978,732 B2

APPARATUS AND METHOD FOR DECIDING TRANSMISSION FORMAT USING VARIABLE FRAME LENGTH AND DECODING METHOD USING THE SAME

TECHNICAL FIELD

The present invention relates to an apparatus and method for deciding a transmission format using a variable frame length in a Digital Video Broadcasting-Satellite version 2 (DVB-S2) system, and a decoding method using the same, in which a physical layer signaling code (PLSC) demodulation and decoding performance can be enhanced by determining a transmitted frame structure without carrying out a PLSC decoding in such a state that a frequency synchronization is not acquired.

BACKGROUND ART

Satellite broadcasting systems such as a DVB-S2 system will be taken as an example, but the present invention is not limited to them.

In recent years, as the demand for high-quality, high-speed satellite broadcasting services are increasing, an adaptive modulation and coding scheme is applied for efficiently using channels and maximizing transmission capacity in the satellite broadcasting systems.

In the case of the adaptive modulation and decoding scheme, lengths of transmitted frames are different according to modulation schemes. Therefore, a receiver must acquire information about transmitted frame structures in order to perform estimation and correction processes using pilot or the like.

According to a conventional method for determining a frame structure, information about the transmitted frame structure is channel-coded in a header of the frame and then is transmitted, and a receiver determines the transmitted frame structure by demodulating and decoding the information about the transmitted frame structure. The satellite broadcasting system such as DVB-S2 system, however, has a limitation in that it cannot meet the requirement of a decoding performance for the information about the frame structure in an initial synchronization mode in which a frequency synchronization is not acquired because of signal distortion caused by low signal-to-noise ratio (SNR) and great frequency offset.

More specifically, the DVB-S2 system is one of satellite broadcasting systems and uses an adaptive modulation and coding scheme in order to overcome bad channel conditions caused by rain attenuation and guarantee transmission capacity. Also, the DVB-S2 system adaptively varies number of bits per frame and selectively inserts pilot sequence, depending on channel state and change in an amount of transmission data.

A receiver of a DVB-S2 broadband adaptive satellite broadcasting system requires a PLSC decoding to determine the transmitted frame structure. The PLSC is (64, 7) codeword in which 7 bits are encoded. The PLSC contains information about modulation, coding, number of bits per frame, and existence/nonexistence of pilot symbol.

The DVB-S2 system considers the frequency offset of −5 MHz to +5 MHz as well as the low SNR. Thus, assuming that the bandwidth is 25 MHz, the frequency offset corresponds to 20% of the bandwidth. Therefore, in an initial synchronization mode in which the frequency estimation and correction are not achieved, the PLSC detection and decoding performance is unsatisfactory due to the performance degradation caused by the frequency offset, even when the symbol synchronization and the frame synchronization are acquired. Moreover, because there is no information about the frame structure when the PLSC decoding is not achieved, fine adjustments such as frequency estimation are impossible.

In other words, in order to identify the frame structure, the conventional adaptive communication system identifies the transmission format by demodulating and decoding a transmission format identifier that is a symbol sequence in which information about the transmission format such as PLSC is described. However, if the adaptive communication scheme is applied to the satellite communication system, such as the DVB-S2 system, in which the frequency offset corresponding to 20% of the bandwidth exists, the PLSC demodulation and decoding performance is degraded by the frequency offset. Consequently, it is difficult to obtain the required performance.

DISCLOSURE OF INVENTION

Technical Problem

It is, therefore, an object of the present invention to provide an apparatus and method for deciding a transmission format using a variable frame length and a decoding method using the same, which can enhance a PLSC demodulation and decoding performance. When a frequency offset exists, information about a frame structure is acquired through a correlation analysis using a length of each transmitted frame, i.e., a length difference, in order to acquire information about the frame structure including existence/nonexistence of pilot prior to the PLSC decoding, number of bits per frame, and transmission modulation scheme.

Other objects and advantages of the present invention can be understood more fully through the embodiments of the present invention. Also, the objects and advantages of the present invention can be easily implemented by means of the following claims and combination thereof.

Technical Solution

In accordance with one aspect of the present invention, there is provided an apparatus for deciding a transmission format using a variable frame length, including: a frame synchronization acquiring unit for acquiring a frame synchronization of a received transmission frame; a correlation analyzing unit for performing a correlation analysis with respect to the transmission frame whose synchronization is acquired, considering frame lengths of respective frame structures; and a transmission frame structure deciding unit for deciding the structure of the received transmission frame using the analyzed correlation.

In accordance with another aspect of the present invention, there is provided a method for deciding a transmission format using a variable frame length, including the steps of: a) acquiring a frame synchronization of a received transmission frame; performing a correlation analysis with respect to the transmission frame whose synchronization is acquired, considering frame lengths of respective frame structures; and deciding a structure of the received transmission frame using the analyzed correlation.

In accordance with a further aspect of the present invention, there is provided a decoding method using a transmission format decision, including the steps of: a) acquiring a frame synchronization of a received transmission frame; b) selecting a frame structure by performing a correlation analysis with respect to the transmission frame whose synchronization is acquired, considering frame lengths of respective frame structures, and deciding the selected frame structure as a structure of the received transmission frame; c) performing frequency/phase estimation and correction; d) determining a physical layer signaling code (PLSC) and performing a PLSC demodulation and decoding; e) comparing the decided frame structure and a frame structure given after the PLSC decoding; and f) determining a current mode as being in an In-sync mode.

Advantageous Effects

In accordance with the present invention, it is possible to obtain the information about the structure of the frame transmitted independently of the frequency offset before the PLSC demodulation and coding in the DVB-S2 system or the like.

Therefore, the fine adjustments can be achieved independently of the PLSC decoding performance. Moreover, the system performance can be further enhanced during the PLSC decoding process by reflecting the obtained result to the PLSC decoding process.

BRIEF DESCRIPTION OF THE DRAWINGS

The above and other objects and features of the present invention will become apparent from the following description of the preferred embodiments given in conjunction with the accompanying drawings, in which:

FIG. 1 illustrates a basic frame structure of a general DVB-S2 system;

FIG. 2 illustrates a location of a PL header and a frame length in a general DVB-S2 system according to modulation schemes;

FIG. 3 is a block diagram of an apparatus for deciding a transmission format using a variable frame length in a satellite broadcasting system in accordance with an embodiment of the present invention;

FIG. 4 is a flowchart illustrating a method for deciding a transmission format using a variable frame length in a satellite broadcasting system in accordance with an embodiment of the present invention;

FIG. 5 is a graph of an error rate when the method of FIG. 4 is applied; and

FIG. 6 is a flowchart illustrating a PLSC decoding method in accordance with an embodiment of the present invention.

BEST MODE FOR CARRYING OUT THE INVENTION

Other objects and aspects of the invention will become apparent from the following description of the embodiments with reference to the accompanying drawings, which is set forth hereinafter. In the following description, well-known functions or constructions are not described in detail since they would obscure the invention in unnecessary detail.

FIG. 1 illustrates a basic frame structure of a general DVB-S2 system.

Referring to FIG. 1, the physical layer (PL) frame of the DVB-S2 system includes a PL header 101 and a forward error correction (FEC) frame 102. Also, the PL header 101 includes a start of frame (SOF) 103 and a PLSC. The PLSC includes a MODCOD 104 and a TYPE 105. The PLSC further includes an HPROT 106 that is additionally generated by a (64, 7) Reed-Muller coding of the MODCOD 104 and the TYPE 105.

It can be seen from FIG. 1 that the number of pilot sequences per frame and the frame length are variable depending on transmission format parameters, such as modulation scheme, number of bits per frame, and existence/nonexistence of the pilot sequence.

A following Table 1 shows the number of the pilot symbols per frame and the frame length, which are variable depending on the transmission format parameters.

TABLE 1

| i (sturcture index) | Modulation scheme | Bits/ frame | Existence/nonexistence of pilot (Number of symbols) | Symbols/ frame ($fl_i$) |
|---|---|---|---|---|
| 1 | QPSK | 64800 | Existence (792) | 33282 |
| 2 | QPSK | 64800 | Nonexistence (0) | 32490 |
| 3 | QPSK | 16200 | Existence (180) | 8370 |
| 4 | QPSK | 16200 | Nonexistence (0) | 8190 |
| 5 | 8PSK | 64800 | Existence (504) | 22194 |
| 6 | 8PSK | 64800 | Nonexistence (0) | 21690 |
| 7 | 8PSK | 16200 | Existence (108) | 5598 |
| 8 | 8PSK | 16200 | Nonexistence (0) | 5490 |
| 9 | 16APSK | 64800 | Existence (396) | 16686 |
| 10 | 16APSK | 64800 | Nonexistence (0) | 16290 |
| 11 | 16APSK | 16200 | Existence (72) | 4212 |
| 12 | 16APSK | 16200 | Nonexistence (0) | 4140 |
| 13 | 32APSK | 64800 | Existence (288) | 13338 |
| 14 | 32APSK | 64800 | Nonexistence (0) | 13050 |
| 15 | 32APSK | 16200 | Existence (72) | 3402 |
| 16 | 32APSK | 16200 | Nonexistence (0) | 3330 |

A can be seen from Table 1, the DVB-S2 frame structure including the frame length and the number of pilot sequences per frame is variable depending on the transmission format, including the modulation scheme, the number of bits per frame, and the existence/nonexistence of the pilot sequence. Therefore, in order for an adequate communication, the receiver must identify the transmission frame structure including the modulation scheme, the number of bits per frame, and the existence/nonexistence of the pilot sequence.

For example, the DVB-S2 system can adaptively support four modulation schemes, i.e., QPSK, 8PSK, 16APSK, and 32APSK, has two types of the number of bits per frame, i.e., 64800 bits and 12400 bits, and can insert or omit the pilot sequence. Thus, the DVB-S2 system must be able to identify 16 variable transmission frame structures.

FIG. 2 illustrates the location of the PL header and a frame length in a general DVB-S2 system according to modulation schemes.

Referring to FIG. 2, the transmission frame structure can be determined using the frame length of each transmission frame, specifically a frame length difference.

Although only the frame length according to the modulation scheme is illustrated in FIG. 2 in order for explanation of the concept, 16 cases of the frame lengths can be considered according to the modulation scheme, the number of bits per frame, and the existence/nonexistence of the pilot as shown in Table 1. Therefore, the 16 transmission frame structures can be identified using the different frame lengths.

In case where the transmission frame is expanded to a plurality of transmission frames, there exists a distance difference between SOFs in 16 transmission frame structures that may be transmitted under the assumption that the frame synchronization is acquired. In the analysis of the SOF correlation considering the frame length, that is, the distance between the SOFs, there is a great possibility that the case that coincides with the transmitted frame structure has the greatest correlation value among the 16 cases.

FIG. 3 is a block diagram of an apparatus for deciding a transmission format using a variable frame length in a satellite broadcasting system in accordance with an embodiment of the present invention.

Referring to FIG. 3, the apparatus for deciding the transmission format includes a frame synchronization acquiring unit 301, a correlation analyzing unit 302, a frame structure selecting unit 303, and a transmission frame structure deciding unit 304. The frame synchronization acquiring unit 301 acquires a frame synchronization with respect to a received transmission frame. The correlation analyzing unit 302 performs a correlation analysis with respect to the transmission frame whose synchronization is acquired, considering the frame length of each frame structure. The frame structure selecting unit 303 selects a frame structure using the analyzed correlation. The transmission frame structure deciding unit 304 decides the selected frame structure as the structure of the received transmission frame and outputs the decided transmission frame structure.

The correlation analyzing unit 302 analyzes a correlation of the SOF of each frame structure. For example, the correlation is analyzed by performing a coherent correlation with respect to the SOF of each frame structure. Also, the correlation analysis uses information about difference between adjacent symbols, considering the frequency offset. This will be described later with reference to Eq. 1.

The frame structure selecting unit 303 selects the frame structure having the maximum correlation value among the correlation values analyzed and calculated by the correlation analyzing unit 302.

FIG. 4 is a flowchart illustrating a method for deciding a transmission format using a variable frame length in a satellite broadcasting system in accordance with an embodiment of the present invention.

Referring to FIG. 4, frame synchronization of a received transmission frame is acquired in step S410. In steps S421 to S42$n$, a correlation analysis is performed considering a frame length of each frame structure. That is, a correlation of an SOF of each frame structure is analyzed and calculated. At this point, the correlation may be analyzed by performing a coherent correlation with respect to the SOF of each frame structure. Also, information about a difference between adjacent symbols is used considering a frequency offset.

Then, a frame structure is selected using the analyzed correlation. That is, a frame structure having a maximum correlation value among the analyzed and calculated correlation values is selected in step S430, and the selected frame structure is decided as a structure of the received frame structure in step S440.

Using Eq. 1, the method for deciding the transmission format according to the present invention performs the SOF correlation analysis with respect to 16 frame structures by using a plurality of SOFs, considering each frame structure. Then, the frame structure having the maximum correlation value among the 16 calculated correlation values is decided as the structure of the received frame structure.

$$v_i = \frac{\left| \sum_{n=1}^{q-1} \sum_{m=0}^{24} r^*_{fl_i \times n + m} s_m \right|^2}{25 \times (q-1) \times \left[ \sum_{n=1}^{q-1} \sum_{m=0}^{24} |r_{fl_i \times n + m}|^2 \right]} \quad \text{Eq. 1}$$

In order to use the method of the present invention, a perfect frame synchronization has to be assumed. In Eq. 1, q denotes the number of frames used for frame structure detection. In all 16 cases, the correlation value of a first frame is equal to a correlation value given in the frame synchronization. Thus, the actual correlation analysis is performed using the SOF of the second to q-th frames after when a signal notifying the frame synchronization is generated. Also, the correlation analysis uses the difference information between adjacent symbols, considering the frequency offset. In Eq. 1, $r_m$ is the difference information between the adjacent reception symbols and is expressed as $$r_m = z_m z_{m+1}^*$$

where $z_m$ is an m-th received symbol, and $s_m$ is the difference information between the adjacent transmission reference symbols and is expressed as $$s_m = y_m y_{m+1}^*$$

where $y_m$ is a reference signal of an m-th transmitted SOF. i (i=1, 2, . . . , 16) denotes an index representing 16 frame structures, $fl_i$ denotes a frame length when the frame structure represented by the index i is transmitted, and $v_i$ is a correlation value analyzed using q number of SOFs in the frame structure represented by the index i. The structure of the received frame is determined by selecting the index i having the maximum correlation value $v_i$ in the detection of the transmitted frame structure. Also, the reception symbol at the time point when the signal notifying the frame synchronization is generated is $z_0$. That is, $$r_0 = z_0 z_1^*$$

Since the frame structures adaptively supported by the DVB-S2 system have the different frame lengths, the present invention identifies the frame length using the correlation analysis of the SOF 103 that is the synchronization word indicating the start of the frame. That is, using Eq. 1, the correlation of a plurality of SOFs is performed in parallel, considering the frame length of each case shown in Table 1, and the frame structure having the maximum correlation value among the 16 correlation values is decided as the structure of the received frame structure.

FIG. 5 is a graph of an error rate when the method of FIG. 4 is applied. The frame structure error means that one of the frame structures that are not the transmitted frame structure is decided as the structure of the transmitted frame. The simulation result of the frame structure detection error is illustrated in FIG. 5.

The simulation was performed under conditions that the transmission bandwidth was 25 MHz and the frequency offset and the phase offset were uniformly distributed in the range of [−5 MHz, +5 MHz] and [−p, +p]. The applied channel is an additive white Gaussian noise (AWGN) channel.

As can be seen from FIG. 5, 10 when 10 frames (q=10) are used for the frame structure detection, the frame structure error rate in the channel environment of $E_s/N_o = -3$ dB exhibits the performance of about $2 \times 10^{-5}$ and an additional performance gain can be obtained when the number of the frames used to detect the frame structure increases.

FIG. 6 is a flowchart illustrating a PLSC decoding method in accordance with an embodiment of the present invention. Specifically, FIG. 6 illustrates the method that can enhance the PLSC detection and demodulation performance by employing the above-described apparatus and method for deciding the transmission format using the variable frame length.

Referring to FIG. 6, the frame synchronization is acquired in step S610. In step S621 to S62$n$, the correlation analysis is performed in parallel with respect to the 16 frame structures that may be transmitted, considering the frame length of each case shown in Eq. 1. In steps S631 and S632, the frame structure having the maximum correlation value is decided as the structure of the received frame. Since these processes have been described in detail with reference to FIG. 4, their detailed description will be omitted for conciseness.

After deciding the frame structure, a carrier is recovered using a known method. That is, the frequency and phase are estimated and compensated using a known method in step S640.

Then, the demodulation and decoding are performed by determining the PLSC in step S650 and the decided frame structure is compared with the frame structure given after the PLSC decoding in step S660. When the two frame structures are different from each other, the process proceeds to the correlation analysis steps S621 to S62n. When the two frame structures are equal to each other, the current mode is determined as the synchronization mode (In-sync. mode) in step S670. Therefore, the PLSC detection performance can be enhanced.

After deciding the frame structure, that is, after acquiring the information about the frame structure, an effective Non Data Aided (NDA) frequency estimation can be performed using a plurality of pilots or information about the modulation scheme. Therefore, after the frequency estimation/compensation and the phase estimation/compensation, the PLSC decision and coding are performed. When the information about the decided frame structure is different from the information about the acquired frame structure, the process returns to the correlation analysis step.

When the PLSC decoding is performed, it is possible to obtain the information about the coding rate applied to the FEC frame, as well as the information of the modulation scheme, the number of bits per frame, and whether to insert the pilot symbol. However, the coding rate does not change the frame structure including the number of pilot symbols per frame and the frame length. Therefore, the coding rate is excluded from the comparison and only the frame structure is compared.

The above-described methods in accordance with the present invention can be stored in computer-readable recording media. The computer-readable recording media may include CDROM, RAM, ROM, floppy disk, hard disk, optical magnetic disk, and so on. Since these procedures can be easily carried out by those skilled in the art, a detailed description thereof will be omitted.

The present application contains subject matter related to Korean patent application Nos. 2005-0121109 and 2006-0034704, filed with the Korean Intellectual Property Office on Dec. 9, 2005 and Apr. 17, 2006, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for deciding a transmission format using a variable frame length, comprising:
   frame synchronization acquiring means for acquiring a frame synchronization of a received transmission frame;
   correlation analyzing means for performing a correlation analysis using a frame length of the transmission frame whose synchronization is acquired, considering frame lengths of predetermined frame structures; and
   transmission frame structure deciding means for deciding the structure of the received transmission frame using the analyzed correlation, wherein
   the correlation analyzing means analyzes and calculates a correlation of a start of frame (SOF) of the frame structures with respect to the transmission frame whose synchronization is required; and
   the transmission frame structure deciding means selects a frame structure having a maximum correlation value among correlation values analyzed and calculated by the correlation analyzing means and decides the selected frame structure as the structure of the received frame structure.

2. The apparatus as recited in claim 1, wherein the correlation analyzing means performs the correlation analysis of the SOF of the frame structures using a following equation, considering the frame lengths of the frame structures, difference information about adjacent symbols being used considering frequency offset $$v_i = \frac{\left|\sum_{n=1}^{q-1}\sum_{m=0}^{24} r^*_{fl_i \times n+m} s_m\right|^2}{25 \times (q-1) \times \left[\sum_{n=1}^{q-1}\sum_{m=0}^{24} |r_{fl_i \times n+m}|^2\right]}$$

where q denotes number of the frames used for frame structure detection, $r_m$ denotes difference information between adjacent reception symbols and is expressed as $r_m = z_m z^*_{m+1}$ where $z_m$ is an m-th received symbol, $s_m$ denotes difference information between adjacent transmission reference symbols and is expressed as $s_m = y_m y^*_{m+1}$ where $y_m$ is a reference signal of an m-th transmitted SOF, i (i=1, 2, ..., 16) denotes an index representing 16 frame structures, $fl_i$ denotes a frame length when the frame structure represented by the index i is transmitted, and $v_i$ is a correlation value analyzed using q number of SOFs in the frame structure represented by the index i.

3. The apparatus as recited in claim 1, wherein the frame lengths of the frame structures vary depending on modulation scheme, number of bits per frame, and existence/nonexistence of pilot sequence.

4. A method for deciding a transmission format using a variable frame length, comprising the steps of:
   acquiring a frame synchronization of a received transmission frame;
   performing a correlation analysis using a frame length of the transmission frame whose synchronization is acquired, considering frame lengths of predetermined frame structures; and
   deciding a structure of the received transmission frame using the analyzed correlation, wherein
   the performing a correlation analysis includes analyzing and calculating a correlation of a start of frame (SOF) of the frame structures with respect to the transmission frame whose synchronization is acquired; and
   the deciding a structure includes the steps of:
   selecting a frame structure having a maximum correlation value among the analyzed and calculated correlation values; and
   deciding the selected frame structure as the structure of the received frame structure.

5. The method as recited in claim 4, wherein the performing a correlation analysis includes the step of performing the correlation analysis of the SOF of the frame structures using a following equation, considering the frame lengths of the frame structures, difference information about adjacent symbols being used considering frequency offset $$v_i = \frac{\left|\sum_{n=1}^{q-1}\sum_{m=0}^{24} r^*_{fl_i \times n+m} s_m\right|^2}{25 \times (q-1) \times \left[\sum_{n=1}^{q-1}\sum_{m=0}^{24} |r_{fl_i \times n+m}|^2\right]}$$

where q denotes number of the frames used for frame structure detection, $r_m$ denotes difference information between adjacent reception symbols and is expressed as $r_m = z_m z^*_{m+1}$ where $z_m$ is an m-th received symbol, $s_m$ denotes difference information between adjacent transmission reference symbols and is expressed as $s_m = y_m y^*_{m+1}$ where $y_m$ is a reference signal of an m-th transmitted SOF, i (i=1, 2, ..., 16) denotes an index representing 16 frame structures, $fl_i$ denotes a frame length when the frame structure represented by the index i is transmitted, and $v_i$ is a correlation value analyzed using q number of SOFs in the frame structure represented by the index i.

6. The method as recited in claim 4, wherein the frame lengths of the frame structures vary depending on modulation scheme, number of bits per frame, and existence/nonexistence of pilot sequence.

7. A decoding method using a transmission format decision, comprising the steps of:
 a) acquiring a frame synchronization of a received transmission frame;
 b) selecting a frame structure by performing a correlation analysis with respect to the transmission frame whose synchronization is acquired, considering frame lengths of respective frame structures, and deciding the selected frame structure as a structure of the received transmission frame;
 c) performing frequency/phase estimation and correction;
 d) determining a physical layer signaling code (PLSC) and performing a PLSC demodulation and decoding;
 e) comparing the decided frame structure and a frame structure given after the PLSC decoding; and
 f) determining a current mode as being in an In-sync mode.

8. The method as recited in claim 7, wherein the step b) includes the steps of:
 analyzing and calculating a correlation of SOFs of the frame structures with respect to the transmission frame whose synchronization is acquired; and
 selecting a frame structure having a maximum correlation value among analyzed and calculated correlation values.

* * * * *